E. B. KILLEN.
PNEUMATIC TIRE.
APPLICATION FILED MAY 6, 1918.
1,337,660.
Patented Apr. 20, 1920.
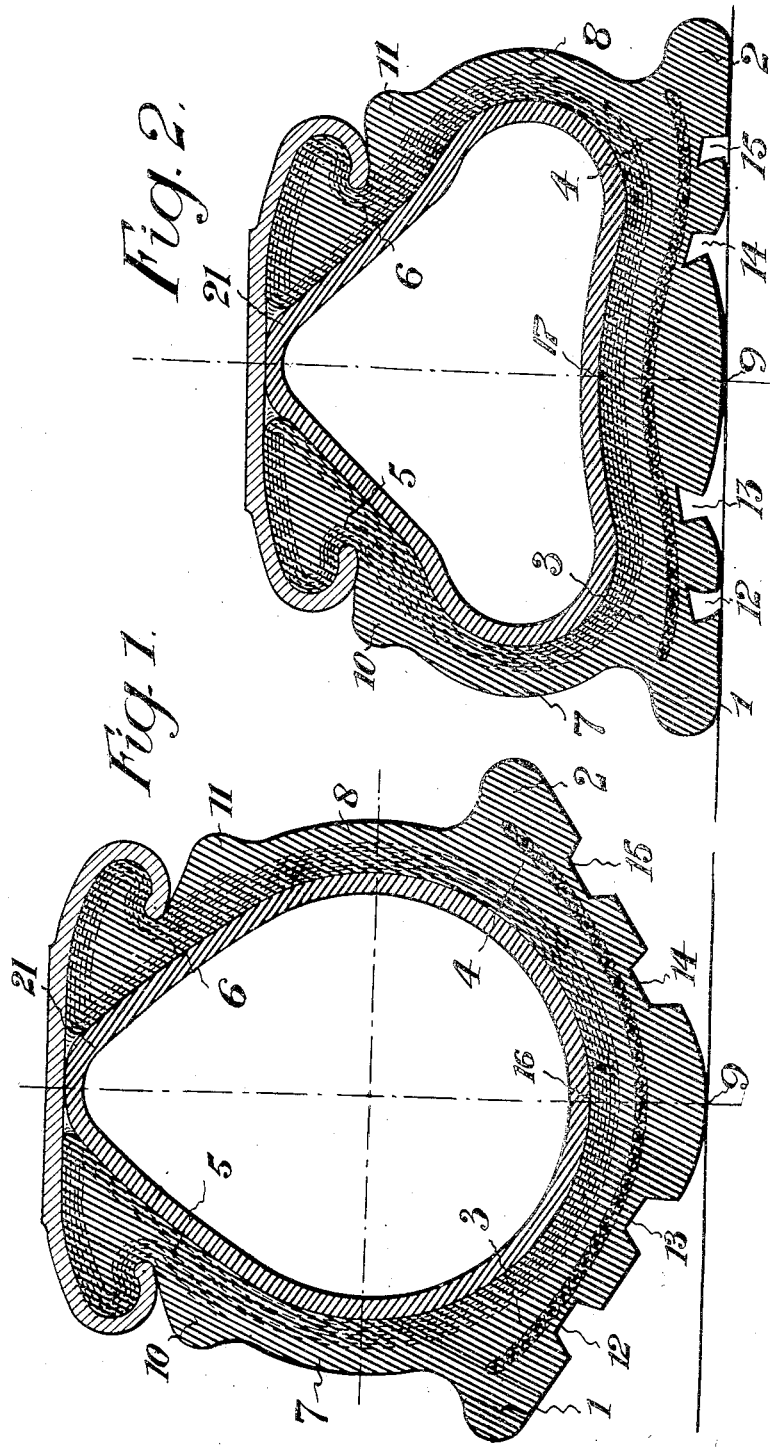

UNITED STATES PATENT OFFICE.

EDWARD BRICE KILLEN, OF LONDON, ENGLAND.

PNEUMATIC TIRE.

1,337,660.    Specification of Letters Patent.    Patented Apr. 20, 1920.

Application filed May 6, 1918. Serial No. 232,860.

*To all whom it may concern:*

Be it known that I, EDWARD BRICE KILLEN, of 27 Queen Victoria street, London, E. C. 4, England, engineer, have invented certain new and useful Improvements in or Relating to Pneumatic Tires, of which the following is a specification.

This invention relates to a new type and construction of pneumatic tire outer cover, and an important feature of the invention is the tread, which is the widest part of the tire and gable-like in shape.

In order that my invention may be properly understood and readily carried into effect, I have hereunto appended one sheet of drawings, of which—

Figure 1 is a cross section of a tire under a minimum or no load made in accordance with and embodying my invention.

Fig. 2 is a similar cross section view representing the tire under an abnormal shock or load.

My construction having reference to the drawings, is as follows:—

My wide tread between and including the side projections or annular side ribs 1, 2, is constructed to vary much in effective width in road contact, see Figs. 1 and 2, according to the load carried or shock received, and to have the greatest possible number of square inches in road contact, under either ordinary or abnormal working conditions, thereby distributing the load or strain over more square inches of tire tread than would be the case with tires which are round, or approximately so, in cross section.

By means of this invention, inflated tube type of tires may be greatly improved in their resiliency or shock absorbing qualities and in their strength, durability and mileage, besides having many other advantages. The tread and walls of the outer cover are constructed so that the most severe flexing takes place close to the widest and safest part of the air chamber, see Fig. 2, and those places 3, 4, 5 and 6 where existing tire covers often prematurely burst or collapse, are in my tire covers strengthened or protected from injury. In my tire, the walls of the cover are constructed thinnest close to the widest part 7 and 8 of the air chamber, but these thin walls are protected from injury by my special construction of wide tread comprising side projections or annular side ribs 1 and 2, the widest part of my tire being the tread and not at the side walls as is usual in most existing inflated pneumatic tires. The construction of my gable-like wide treading circumference is of vital importance, because it not only prevents the thinnest and most flexible part in each tire wall from coming into contact with curbstones, but it protects the tire in many other ways from injury, as when the tire is overloaded or traveling on rough or uneven roads, or turning corners sharply, or passing over potholes, or when subjected to those abnormal working strains which often prematurely destroy existing inflated tires. It is to be specially noted that under correct working conditions, the extreme treading circumference of my tire has a greater flat area in road contact than existing pneumatic tires of similar dimensions, and that the effective width of the tread of my tire is ever changing, according to the load carried, shock received, or road traveled on.

My new and special construction of wide and resilient tread enables the tire to stand shocks which would destroy the foundations of existing tires, without my tire being injured, and it is to be noted that the rubber in the apex 9 of the gable-like tread is automatically compressed when in action, and the more severe the strain, the greater is the rubber compression, and this compression takes place over the wide tread without the fabric or cord foundations of the tire cover being injured. The wide tread is constructed of such a gable-like shape in cross-section that it is able to give much and become flattened, transversely, at its tread under load or shock, and this construction of tread enables the extreme apex of the tire to come into road contact and be put under compression before the full width of the tread comes into action.

With this new construction of tread there is a reserve of tire width, which automatically comes into effective action as and when required, as when running over tramway lines or passing over potholes, and yet the apex or extreme treading circumference 9 of my tire is very resilient.

I preferably strengthen and stiffen each tire wall close to their base beads at 5 and 6, and mold on the outside of each wall an endless cushioning rubber rib 10, 11, which ribs lie outside the tire's metal retaining rim. This construction of tire cover compels the severest flexing of the tire walls to take place close to the widest part 7 and 8 of the air chamber, see Fig. 2, and those places which are strengthened and stiffened inside and outside of the widest part of the side walls in my cover, are saved from premature collapse under severe working conditions. In other words, the endless or annular ribs 10 and 11 on the tire cover, and which are on that part of the tire cover adjacent to the wheel rim, strengthen the tire or tire cover at the points which are usually subjected to greatest wear or strain and at which points "blow outs" are usually most liable to occur.

In this invention, the wide tread and walls of my tire cover may be built up in any efficient and well-known manner with fabric cord or other suitable foundations, provided the gable-like treading circumference of the tire is constructed to become flattened under load or shock, thereby causing a great tread surface to be obtained in road contact under ordinary and abnormal working conditions, the extra width or margin of safety in the tread coming into effective action as and when required. The difference in the extreme diameter of the apex of the tread and the extreme diameter of the right and left edges of the tread may be 2 to 4 inches, and the width of the tread may be ¼ inch to 1¼ inches more than the extreme diameter through the side walls of my tire, according to the type or dimensions of the tire manufactured, but in all cases, the extreme width of the tread is preferably sufficient to protect the side walls of the tire where the walls are thinnest from curbstones, even when the tire is underinflated. The internal circumference of the tire cover in cross section may be constructed similar to the internal circumference of existing tire covers, and the flexible sides or walls of the tire are preferably formed internally to the arc of a circle and so that they are able to bulge safely outward at each side of the tire and yet be well protected from curbstones and other objectionable road inequalities, by the wide tread, which is not only manufactured wider than the side walls of the tire but remains wider under all working conditions.

The tire cover may be rigidly attached to existing types of tire retaining metal rims, but when possible, I prefer to attach the covers with their stiff base beads (or inner tire parts) to wheels which have removable rims, so that the base beads may not be seriously stretched when fitting the tire to its metal retaining rim, and such a tire fit enables the toes of the base beads to be rigidly held tightly down against the metal bed of the tire retaining rim by any suitable means and the tire cover does not entirely depend upon the compressed air within the tire to keep it in position on its rim.

I preferably mold on each side of the apex of the tread suitable cavities or spaces 12, 13, 14 and 15, which allow the road grease and mud to flow into said cavities or spaces when the extreme circumference of the tread gets into direct biting contact with the hard road surface, thereby forming a non-skid device without the use of steel studs. The cavities or spaces formed at each side of the apex of the tread may be annular or endless and molded in any suitable and well-known shape to suit the wide gable-like type of tread manufactured.

In this gable-like construction of tread, it is to be specially noted that extra strong and practically unpuncturable foundations may be used in building up the tire cover without interfering with the tire's great resiliency or shock absorbing qualities, because the wide treading circumference is constructed of such a shape that its extreme circumference causes that part 16, see Fig. 1, of the tire's foundation which forms the arc of a circle within the apex, to be easily and safely bent back to a considerable extent in spite of the air pressure, see 17, Fig. 2, and this flexing of the tire's outer circumference occurs without injuring the tire's cord or fabric foundations.

It is to be noted that in cross section the extreme outer circumference of my tire, the apex 9, not only comes into contact with the road before the wider part of the tread, but it remains in close and biting contact with the road during the time the extra width 1 and 2 comes in and goes out of road contact, and the entire width of the tread when brought into action under abnormal shocks does not interfere with the biting contact of the apex 9, see Fig. 2. It is, however, the extra amount of tire wall circumferentially brought into road contact which effectively strengthens or adds to the supporting effect or resistance of the tire automatically with increase of load. Whether the tire be greatly compressed or not the thick and strong annular side projections 1 and 2, extending laterally beyond the side walls of the tire, will serve as guards for the tire to protect the somewhat weaker side portions of the same from abrasion against curbstones or the like.

In this invention, I take full advantage of the gable-like resilient construction of wide tread and its ability to become flat in cross section under load or shock, to safely obtain the greatest possible amount of elasticity or resilience in road contact in an inflated tire under ordinary and abnormal working conditions, and this type of gable-like tread enables the combination of greater resiliency, greater strength, and greater mileage, to be obtained in inflated tires manufactured under this invention than in existing types of inflated tires.

This invention enables an inflated tire to be manufactured having the advantages of a narrow effective tread, see Fig. 1, without its disadvantages, and the advantages of a wide effective tread, see Fig. 2, without its disadvantages, and an important feature about this type of tire is that it is very resilient under light loads and increases in resiliency and effective strength under heavy loads. This result is due to the fact that the tread of my improved tire is, in cross section, normally inclined, so as to give the general effect of a transverse curve, from the apex 9 of the gable-like structure, to the outer annular ribs or corner projections 1 and 2; so that while the tire will only be slightly flattened transversely under light loads, and will thus be properly resilient, it will, when greatly flattened under heavy loads, as shown in Fig. 2, present a very broad tread surface owing to the said annular ribs or corner projections 1 and 2, while the said annular ribs or projections 1 and 2, in coöperation with the thickening annular ribs or projections 10 and 11 reinforce and strengthen the tire both outside and inside of its point of greatest internal diameter at the transverse central part of the tire. The outer cover of the tire may be constructed in all required dimensions and of suitable materials, using a suitable inner air tube 21.

It is to be noted that when using my type of outer cover, an air tube suitable for say an existing 880 x 120 type of tire cover is suitable for my 880 x 135 type of tire cover, because the internal dimensions of the two covers may be the same.

Claim:

A hollow pneumatic tire or tire cover having a tread portion comprising, normally, a central annular, transversely-curved, road bearing or tread portion, and, at each side of said central portion, and outwardly inclined therefrom, other bearing or tread portions spaced apart by grooves, the outermost of said last-named bearing or tread portions being thick and strong and extending laterally beyond the side walls of the said tire or tire cover; this construction affording proper resilience under light loads, and great circumferential road contact, great tread width and great traction under heavy loads, as also affording protection to said side walls from chafing against curbstones and the like, as set forth.

In testimony whereof I affix my signature in presence of two witnesses.

EDWARD BRICE KILLEN.

Witnesses:
 JOHN LIDDLE,
 JOHN TRAIN LIDDLE.